US009765842B2

(12) United States Patent
Noguchi

(10) Patent No.: US 9,765,842 B2
(45) Date of Patent: Sep. 19, 2017

(54) SUSPENSION DEVICE

(71) Applicant: KAYABA INDUSTRY CO., LTD., Tokyo (JP)

(72) Inventor: Nobuhiro Noguchi, Aichi (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/429,628

(22) PCT Filed: Oct. 4, 2013

(86) PCT No.: PCT/JP2013/077173
§ 371 (c)(1),
(2) Date: Mar. 19, 2015

(87) PCT Pub. No.: WO2014/057897
PCT Pub. Date: Apr. 17, 2014

(65) Prior Publication Data
US 2015/0233442 A1    Aug. 20, 2015

(30) Foreign Application Priority Data

Oct. 9, 2012 (JP) .................................. 2012-223767

(51) Int. Cl.
*F16F 9/48* (2006.01)
*F16F 9/06* (2006.01)
*F16F 9/088* (2006.01)

(52) U.S. Cl.
CPC ................ *F16F 9/48* (2013.01); *F16F 9/062* (2013.01); *F16F 9/088* (2013.01)

(58) Field of Classification Search
CPC .... F16F 9/18; F16F 9/06; F16F 13/002; F16F 5/00; F16F 9/303; F16F 9/48; F16F 9/516; F16F 9/062; F16F 9/066

USPC .................... 188/284, 314; 267/64.11, 64.26
See application file for complete search history.

(56) References Cited

U.S. PATENT DOCUMENTS

| 3,817,566 A | * | 6/1974 | Keijzer | ..................... F16F 9/06 |
| | | | | 188/314 |
| 3,853,311 A | * | 12/1974 | Kreuzer | .................. B60R 19/32 |
| | | | | 188/288 |
| 3,944,198 A | * | 3/1976 | Sakamoto | ............... B60R 19/32 |
| | | | | 188/288 |
| 4,139,182 A | * | 2/1979 | Nagase | ..................... F16F 9/49 |
| | | | | 16/51 |
| 4,915,364 A | | 4/1990 | Perlini | |

(Continued)

FOREIGN PATENT DOCUMENTS

| DE | EP 0389828 A2 | * | 10/1990 | ........... B60G 17/005 |
| DE | 19729287 A1 | * | 1/1999 | ............. B60R 19/40 |

(Continued)

*Primary Examiner* — Anna Momper
*Assistant Examiner* — Mahbubur Rashid
(74) *Attorney, Agent, or Firm* — Rabin & Berdo, P.C.

(57) ABSTRACT

A suspension device includes a shock absorber, an air spring that consists of a compressed gas that is sealed within an air chamber that expands/contracts in volume as the shock absorber extends/compresses so as to constantly bias the shock absorber in an extension direction, and a volume expanding mechanism that expands a volume of the air chamber according to an increase in a compression amount of the shock absorber when the compression amount of the shock absorber has reached or exceeded a predetermined amount.

5 Claims, 4 Drawing Sheets

(56) References Cited

U.S. PATENT DOCUMENTS

| | | | | |
|---|---|---|---|---|
| 5,219,414 A * | 6/1993 | Yamaoka | ................ | F16F 9/516 |
| | | | | 188/284 |
| 5,285,877 A * | 2/1994 | Bonenberger | .......... | B60R 19/32 |
| | | | | 188/266.2 |
| 5,582,385 A * | 12/1996 | Boyle | ................ | B60G 17/018 |
| | | | | 188/266.1 |
| 6,247,683 B1 * | 6/2001 | Hayakawa | ........... | B60G 17/002 |
| | | | | 267/64.11 |
| 6,938,887 B2 * | 9/2005 | Achenbach | ........... | B60G 17/08 |
| | | | | 188/315 |
| 2002/0190445 A1 * | 12/2002 | Achenbach | .......... | B60G 15/065 |
| | | | | 267/64.26 |
| 2011/0101579 A1 * | 5/2011 | Polakowski | ........... | B60G 15/12 |
| | | | | 267/64.26 |
| 2012/0048665 A1 * | 3/2012 | Marking | ................ | B60G 13/08 |
| | | | | 188/287 |

FOREIGN PATENT DOCUMENTS

| | | | | |
|---|---|---|---|---|
| DE | 10041028 A1 * | 3/2002 | ................ | F16F 9/06 |
| GB | 2312033 A * | 10/1997 | ................ | F16F 9/02 |
| JP | 56-063146 A | 5/1981 | | |
| JP | 57-134035 A | 8/1982 | | |
| JP | 09-196106 A | 7/1997 | | |
| JP | 2010-185572 A | 8/2010 | | |

* cited by examiner

SUSPENSION DEVICE

TECHNICAL FIELD

The present invention relates to a suspension device.

BACKGROUND ART

Generally, a suspension device is interposed between a vehicle body and a vehicle wheel in an automobile or motorcycle or the like, and includes a shock absorber that generates a damping force and a suspension spring that biases the shock absorber in an extension direction to elastically support the vehicle body. Thereby, the suspension device can absorb impacts due to unevenness on a road surface with the suspension spring and suppress extension/compression of the suspension spring that occurs along with such impact absorption with the shock absorber, and thus the suspension device can suppress the transmission of impacts due to unevenness on a road surface to the vehicle body.

For example, the suspension device disclosed in JP2010-185572A is a front fork that suspends a front wheel in a saddle-type vehicle such as a motorcycle or a three-wheeled vehicle.

The shock absorber in the above-mentioned suspension device includes a shock absorber main body having an outer tube and an inner tube that is retractably inserted into the outer tube. The suspension spring of the above-mentioned suspension device is an air spring that is accommodated within the shock absorber main body. The air spring consists of compressed gas that is sealed within an air chamber formed within the shock absorber main body that expands/contracts in volume as the shock absorber extends/compresses so as to constantly bias the shock absorber in an extension direction.

In this way, when the suspension spring is an air spring, the weight of the suspension device can be reduced compared to a case in which the suspension spring is a coil spring. However, in an initial stage of a stroke of the suspension device in which the compression amount of the shock absorber is small, the suspension device may not be compressed quickly and this can lead to impairment in the riding comfort of the vehicle. Therefore, the above-mentioned suspension device includes a balance spring that counteracts any opposing force from the air spring (suspension spring) in the initial stage of the stroke of the suspension device, and thereby impairment in the riding comfort of the vehicle is suppressed.

SUMMARY OF INVENTION

However, in the above-mentioned suspension device, the opposing force characteristics during the initial stage of the stroke at which the compression amount of the shock absorber is small and the balance spring acts are realized as composite characteristics of both the balance spring and the air spring. Therein, since the balance spring is a coil spring, the opposing force characteristics of the suspension device are substantially linear. In the middle and late stages of the stroke at which the compression amount of the shock absorber is large and the balance spring no longer acts, the opposing force characteristics are realized by only the air spring. Therein, since the pressure and volume of a gas are inversely proportional to each other under a constant temperature, the opposing force characteristics of the suspension device are non-linear. Therefore, in the above-mentioned suspension device, if the air spring (suspension spring) is adjusted so that the opposing force during the middle stage of the stroke becomes large, the opposing force may become too large during the late stage of the stroke.

The present invention was created in consideration of the above-described problems, and an object thereof is to provide a suspension device including an air spring that constantly biases a shock absorber in an extension direction, in which an opposing force during a late stage of a stroke can be prevented from becoming too large even if the opposing force during a middle stage of the stroke is increased.

According to one aspect of the present invention, a suspension device includes a shock absorber, an air spring that consists of a compressed gas that is sealed within an air chamber that expands/contracts in volume as the shock absorber extends/compresses so as to constantly bias the shock absorber in an extension direction, and a volume expanding mechanism that expands a volume of the air chamber according to an increase in a compression amount of the shock absorber when the compression amount of the shock absorber has reached or exceeded a predetermined amount.

DESCRIPTION OF EMBODIMENTS

An embodiment of the present invention will now be explained below with reference to the attached drawings.

Figure 1:
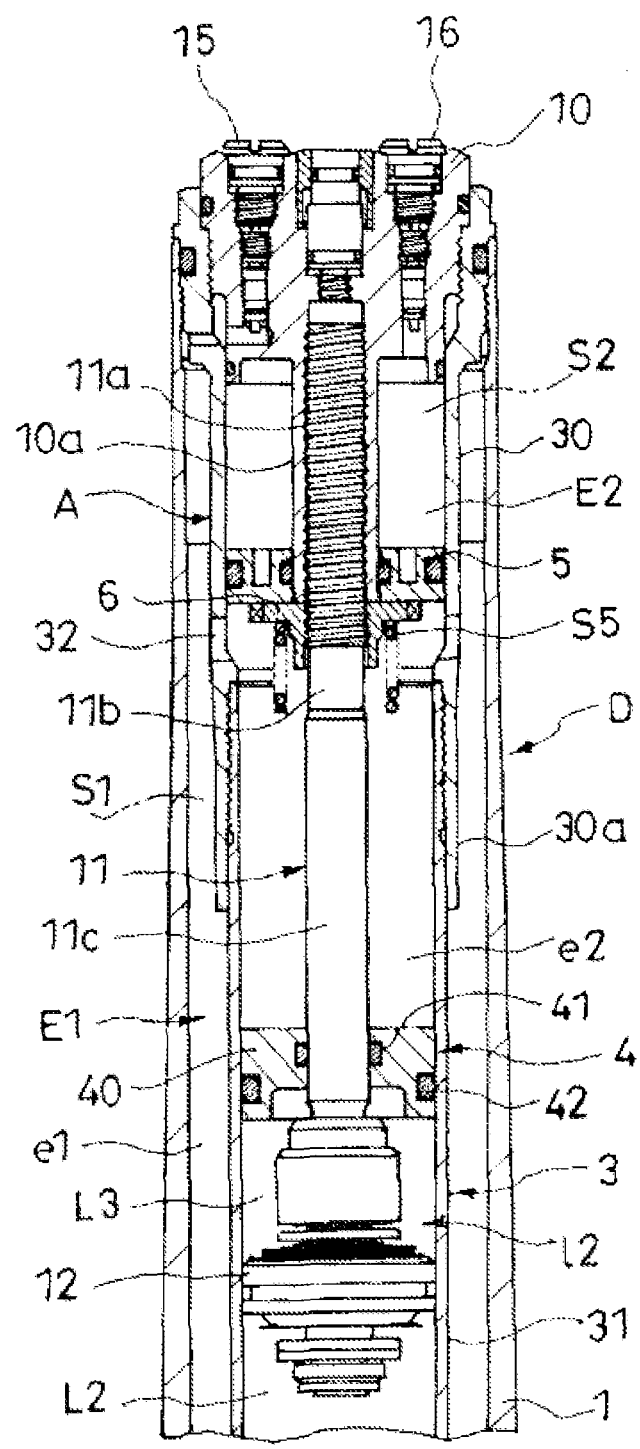
FIG. 1 is a cross-section view illustrating the essential parts of a suspension device according to an embodiment of the present invention.
Figure 2:
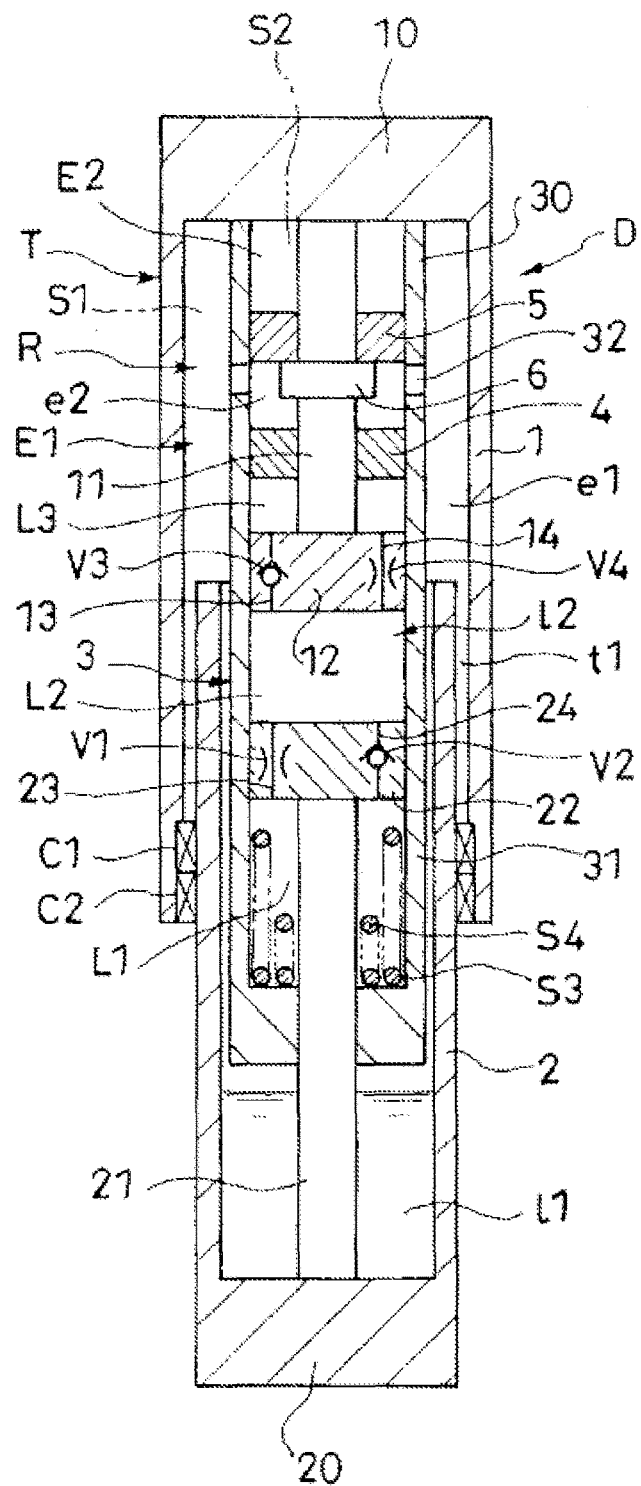
FIG. 2 is a schematic view illustrating the suspension device according to this embodiment of the present invention.
Figure 3:
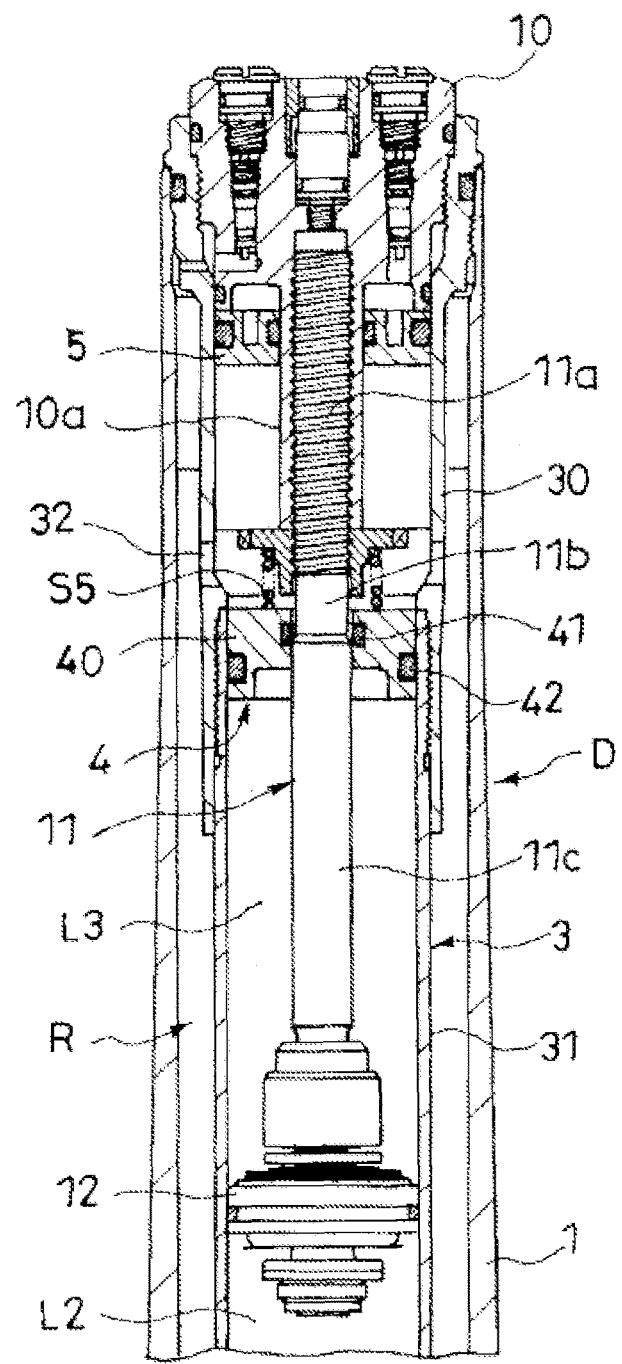
FIG. 3 is a cross-section view illustrating the suspension device according to this embodiment of the present invention in a state of maximum compression.

FIG. 1 is a cross-section view illustrating the essential parts of a suspension device according to this embodiment of the present invention. FIG. 2 is a schematic view illustrating the suspension device according to this embodiment of the present invention. FIG. 3 is a cross-section view illustrating the suspension device according to this embodiment of the present invention in a state of maximum compression. Throughout these drawings, identical reference numerals indicate identical parts.

As shown in FIG. 1, the suspension device according to this embodiment includes a shock absorber D and an air spring S1 that constantly biases the shock absorber D in an extension direction. The air spring S1 consists of a compressed gas that is sealed in an air chamber E1 that expands/contracts in volume as the shock absorber D extends/compresses. The suspension device also includes a volume expanding mechanism A that expands the volume of the air chamber E1 according to an increase in the compression amount of the shock absorber D when the compression amount of the shock absorber D has reached or exceeded a predetermined amount.

The present embodiment will be explain in further detail below. The suspension device according to the present embodiment is a front fork that suspends a front wheel in a saddle-type vehicle such as a motorcycle or a three-wheeled vehicle. As shown in FIG. 2, the shock absorber D includes a shock absorber main body T having an outer tube 1 connected to the vehicle body side and an inner tube 2 that is connected to the vehicle wheel side and is retractably inserted into the outer tube 1.

A vehicle body-side opening (top end in FIG. 2) of the shock absorber main body T is sealed by a cap member 10 that is attached to the outer tube 1, and a vehicle wheel-side opening (bottom end in FIG. 2) is sealed by a bottom member 20. An external air-side opening of a cylindrical gap t1 formed between the overlapping parts of the outer tube 1 and the inner tube 2 is sealed by an annular oil seal C1 and an annular dust seal C2 that are retained in series on an inner periphery of a vehicle wheel-side end of the outer tube 1 and slidingly contact an outer peripheral surface of the inner tube 2. Thereby, the inside of the shock absorber main body T is partitioned off from an external air side and gas or liquid accommodated within the shock absorber main body T can be prevented from flowing outside the shock absorber main body T.

The shock absorber D includes a cylinder body 3 that is retained in a state in which it is suspended from the cap member 10 and stands up along an axial core part of the shock absorber main body T, and a reservoir R is formed between the cylinder body 3 and the shock absorber main body T. In the reservoir R, a reservoir internal liquid chamber 11 is formed to retain a working liquid consisting of a liquid such as oil, water, or an aqueous solution, and a reservoir internal gas chamber e1 is formed to seal a gas above the working liquid.

As shown in FIG. 1, the cylinder body 3 consists of a sub-cylinder 30 and a cylinder 31 that are connected in the axial direction. A base end of the sub-cylinder 30 is threaded onto the cap member 10, and the sub-cylinder 30 is retained in a state in which it is suspended from the cap member 10. Further, the cylinder 31 is threaded into an inner periphery of a distal end 30a of the sub-cylinder 30, and thereby retained on the cap member 10 via the sub-cylinder 30.

As shown in FIG. 2, a free piston 4 that slidingly contacts an inner peripheral surface of the cylinder 31 is inserted into the cylinder 31 such that it can move in the axial direction. Further, a cylinder internal liquid chamber 12 in which a working liquid is accommodated and a cylinder internal gas chamber e2 in which a gas is accommodated are formed in the cylinder 31. The cylinder internal liquid chamber 12 and the cylinder internal gas chamber e2 are divided by the free piston 4.

The shock absorber D includes a piston rod 21 that is retained on the bottom member 20 and retractably inserted into the cylinder internal liquid chamber 12, a piston 22 that is retained on a distal end of the piston rod 21 and slidingly contacts an inner peripheral surface of the cylinder 31, a base rod 11 that is retained on the cap member 10 and stands up along an axial core part on the opposite side of the piston rod 21 of the cylinder 31, and a base member 12 that is retained on a distal end of the base rod 11 and is fixed to an inner periphery of the cylinder 31. The piston 22 and the base member 12 divide the cylinder internal liquid chamber 12 into three chambers L1, L2, and L3 that are filled with working liquid. An extension-side chamber L1 is formed on the underside of the piston 22, a compression-side chamber L2 is formed between the piston 22 and the base member 12, and a liquid-pool chamber L3 is formed on the top side of the base member 12.

An extension-side piston flow passage 23 and a compression-side piston flow passage 24 that are in communication with the extension-side chamber L1 and the compression-side chamber L2 are formed in the piston 22. Further, an extension-side damping valve V1 that applies resistance to working liquid passing through the extension-side piston flow passage 23 and a compression-side check valve V2 that only permits working liquid to pass through the compression-side piston flow passage 24 to move from the compression-side chamber L2 to the extension-side chamber L1 are provided to the piston 22.

An extension-side base member flow passage 13 and a compression-side base member flow passage 14 that are in communication with the extension-side chamber L2 and the liquid-pool chamber L3 are formed in the base member 12. Further, an extension-side check valve V3 that only permits working liquid to pass through the extension-side base member flow passage 13 and move from the liquid-pool chamber L3 to the compression-side chamber L2 and a compression-side damping valve V4 that applies resistance to working liquid passing through the compression-side base member flow passage 14 are provided to the base member 12.

According to the above-described constitution, during extension of the shock absorber D (suspension device) in which the inner tube 2 exits from the outer tube 1 and the piston rod 21 exits from the cylinder 31, working liquid in the extension-side chamber L1 that is pressurized by the piston 22 passes through the extension-side piston flow passage 23 and moves into the compression-side chamber L2. At this time, a volume of working liquid equivalent to the volume of the piston rod 21 that exits from the cylinder 31 passes through the extension-side base member flow passage 13 and moves from the liquid-pool chamber L3 to the compression-side chamber L2. Thus, the free piston 4 moves to the bottom side of FIG. 2.

During compression of the shock absorber D (suspension device) in which the inner tube 2 enters into the outer tube 1 and the piston rod 21 enters into the cylinder 31, working liquid in the compression-side chamber L2 that is pressurized by the piston 22 passes through the compression-side piston flow passage 24 and moves into the extension-side chamber L1. At this time, a volume of working liquid equivalent to the volume of the piston rod 21 that enters into the cylinder 31 passes through the compression-side base member flow passage 14 and moves from the compression-side chamber L2 to the liquid-pool chamber L3. Thus, the free piston 4 moves to the top side of FIG. 2.

Thereby, the shock absorber D generates a damping force arising from the resistance when working liquid passes through the piston flow passages 23 and 24 and the base member flow passages 13 and 14 in accordance with the extension/compression of the suspension device. In the present embodiment, the resistance generated by the extension-side check valve V3 and the compression-side check valve V2 is set so that it is smaller than the resistance generated by the extension-side damping valve V1 and the compression-side damping valve V4. Therefore, the damping force generated by the shock absorber D arises mainly from the resistance of the extension-side damping valve V1 and the compression-side damping valve V4. However, the valve structure with which the shock absorber D generates the damping force is not limited to the above-described structure, and any appropriate well-known constitution can be used.

As shown in FIG. 1, the cylinder internal gas chamber e2 formed within the cylinder 31 is in communication with the reservoir internal gas chamber e1 via a communication hole 32 formed in the sub-cylinder 30, and constitutes the air chamber E1 together with the reservoir internal gas chamber e1.

According to the above-described constitution, during extension of the shock absorber D, the inner tube 2 exits from the outer tube 1 and the free piston 4 moves to the bottom side in FIG. 1. Thus, the volume of the air chamber E1 expands. Further, during compression of the shock absorber D, the inner tube 2 enters into the outer tube 1 and the free piston 4 moves to the top side in FIG. 1. Thus, the volume of the air chamber E1 contracts.

Compressed gas is sealed into the air chamber E1, and the sealed compressed gas functions as the air spring S1. The air spring S1 functions as a suspension spring that constantly biases the shock absorber D in the extension direction to elastically support the vehicle body.

As shown in FIG. 1, an air valve 15 for the air chamber E1 is attached to the cap member 10. By intake/discharge of gas into/out of the air chamber E1 via the air valve 15, the opposing force of the air spring S1 can be adjusted.

As shown in FIG. 2, in the initial stage of the stroke of the suspension device in which the compression amount of the shock absorber D is small, the balance spring S3 that biases the shock absorber D in a compression direction is accommodated in the extension-side chamber L1. The balance spring S3 counteracts the opposing force of the air spring S1 (suspension spring) at the time of maximum extension of the suspension device. Therefore, even if an air spring is used as the suspension spring that elastically supports the vehicle body, impairment in the riding comfort of the vehicle can be suppressed.

A rebound spring S4 that is compressed at the time of maximum extension of the suspension device to generate a predetermined opposing force is provided to the extension-side chamber L1 of the shock absorber D. Thereby, impacts at the time of maximum extension of the suspension device can be absorbed.

As shown in FIG. 1, the base rod 11 includes a threaded part 11a that has a thread groove formed on the outer periphery thereof and is threaded into an inner periphery of a retaining part 10a of the cap member 10, a small outer diameter part 11b that extends coaxially from a distal end side of the threaded part 11a, a large outer diameter part 11c that extends coaxially from a distal end side of the small outer diameter part 11b and is formed with an outer diameter that is larger than that of the small outer diameter part 11b, and an attachment part (not illustrated) that has the base member 12 retained on the outer periphery thereof and extends coaxially from a distal end side of the large outer diameter part 11c.

A stopper 6 of the volume expanding mechanism A to be explained later is threaded onto an outer periphery of the threaded part 11a, and locks the base rod 11 with a double-nut structure. A return spring S5 that pushes the free piston 4 back to the liquid-pool chamber L3 side (the bottom side in FIG. 1) when the free piston 4 abuts it is provided on the stopper 6.

The free piston 4 includes a free piston main body 40 formed in an annular shape, an annular inner periphery seal 41 that is retained on an inner periphery of the free piston main body 40 and slidingly contacts an outer peripheral surface of the base rod 11, and an annular outer periphery seal 42 that is retained on an outer periphery of the free piston main body 40 and slidingly contacts an inner peripheral surface of the cylinder 31.

When the inner periphery seal 41 slidingly contacts an outer peripheral surface of the large outer diameter part 11c, the free piston 4 can divide the liquid-pool chamber L3 (the cylinder internal liquid chamber 12) and the cylinder internal gas chamber e2 (the air chamber E1). However, if the shock absorber D is compressed so that the free piston 4 moves to the top side in FIG. 1 and the inner periphery seal 41 reaches the small outer diameter part 11b as shown in FIG. 3, the return spring S5 is compressed by the free piston 4 and a gap is formed between the inner periphery seal 41 and the small outer diameter part 11b. Therefore, working liquid of the liquid-pool chamber L3 can pass through the gap between the inner periphery seal 41 and the small outer diameter part 11b and the communication hole 32 to move into the reservoir R.

If the shock absorber D shifts from the compression process to the extension process and the internal pressure of the liquid-pool chamber L3 drops, the free piston 4 is pushed back to the liquid-pool chamber L3 side (the bottom side in FIG. 3) by the opposing force of the return spring S5. Thereby, the free piston 4 moves to a position at which the inner periphery seal 41 slidingly contacts the outer peripheral surface of the large outer diameter part 11c.

Next, the volume expanding mechanism A will be explained.

The volume expanding mechanism A expands the volume of the air chamber E1 according to an increase in the compression amount of the shock absorber D when the compression amount of the shock absorber D has reached or exceeded a predetermined amount. The volume expanding mechanism A includes the sub-cylinder 30, an auxiliary chamber E2 formed within the sub-cylinder 30, a movable partition wall 5 that slidingly contacts an inner peripheral surface of the sub-cylinder 30 to divide the air chamber E1 and the auxiliary chamber E2, an air spring S2 serving as a biasing means that biases the movable partition wall 5 to the air chamber E1 side (the bottom side in FIG. 1), and the stopper 6 that prevents the movable partition wall 5 from moving to the air chamber E1 side (the bottom side in FIG. 1) when the compression amount of the shock absorber D is less than a predetermined amount.

The air spring S2 is a compressed gas that is sealed within the auxiliary chamber E2. The internal pressure of the auxiliary chamber E2 is set so that the movable partition wall 5 moves to the auxiliary chamber E2 side (the top side in FIG. 1) when the compression amount of the shock absorber D has reached or exceeded a predetermined amount. An air valve 16 for the auxiliary chamber E2 is attached to the cap member 10, and the opposing force of the air spring S2, or in other words the force that biases the movable partition wall 5 to the air chamber E1 side can be adjusted by intake/discharge of gas into/out of the auxiliary chamber E2 via the air valve 16.

Figure 4:
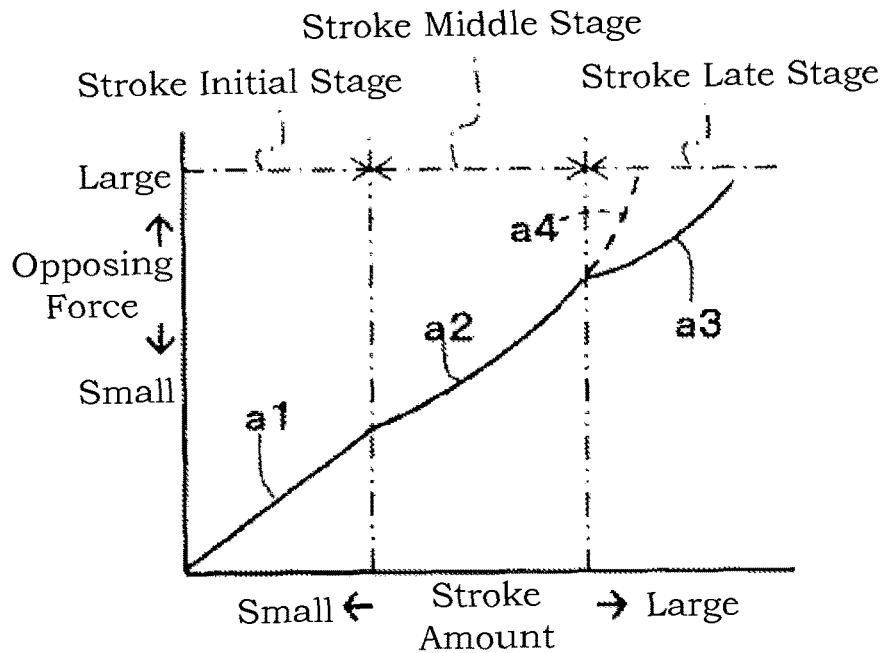
FIG. 4 is a graph illustrating the relationship between a stroke amount and an opposing force in the suspension device according to this embodiment of the present invention.

Next, the operation of the volume expanding mechanism A will be explained referring to FIG. 4. FIG. 4 is a graph illustrating the relationship between a stroke amount and an opposing force in the suspension device according to the present embodiment of the invention.

At the initial stage of the stroke of the suspension device, or in other words in a state in which the compression amount of the shock absorber D has not reached the predetermined amount and the balance spring S3 acts, the movable partition wall 5 is pressed to the stopper 6 by the biasing force of the air spring S2, and thus it is maintained in a state in which it abuts the stopper 6 and does not move. At this time, the opposing force characteristics of the suspension device are realized as composite characteristics of both the balance spring S3 and the air spring S1. Therein, since the balance spring S3 in the present embodiment is a coil spring, the opposing force characteristics in the initial stage of the stroke of the suspension device are substantially linear as shown by the solid line a1 in FIG. 4.

At the middle stage of the stroke of the suspension device, or in other words in a state in which the compression amount of the shock absorber D has not reached the predetermined amount and the balance spring S3 does not act, the movable partition wall 5 is maintained in a state in which it abuts the stopper 6 and does not move. At this time, the opposing force characteristics of the suspension device are realized by only the air spring S1. Therein, since the pressure and volume of a gas are inversely proportional to each other under a constant temperature, the opposing force characteristics in the middle stage of the stroke of the suspension device are non-linear as shown by the solid line a2 in FIG. 4.

Further, at the late stage of the stroke of the suspension device, or in other words in a state in which the compression amount of the shock absorber D has reached or exceeded the predetermined amount, the movable partition wall 5 moves to the auxiliary chamber E2 side (the top side in FIG. 1) against the biasing force of the air spring S2 and separates from the stopper 6. As the compression amount of the shock absorber D increases, the amount of movement of the movable partition wall 5 also increases. Thus, as the compression amount of the shock absorber D increases, the volume of the air chamber E1 expands. At this time, the opposing force characteristics of the suspension device are realized as composite characteristics of both the air spring S1 and the air spring S2, and thus they are non-linear as shown by the solid line a3 in FIG. 4.

The stroke stages of the suspension device are divided into the initial stage of the stroke, the middle stage of the stroke, and the late stage of the stroke in order from the smallest amount of stroke according to the stroke amount of the suspension device (the compression amount of the shock absorber D). However, the threshold for each stroke stage can be arbitrarily set.

Next, the operational effects of the suspension device according to the present embodiment will be explained referring to a comparative example.

Figure 5:
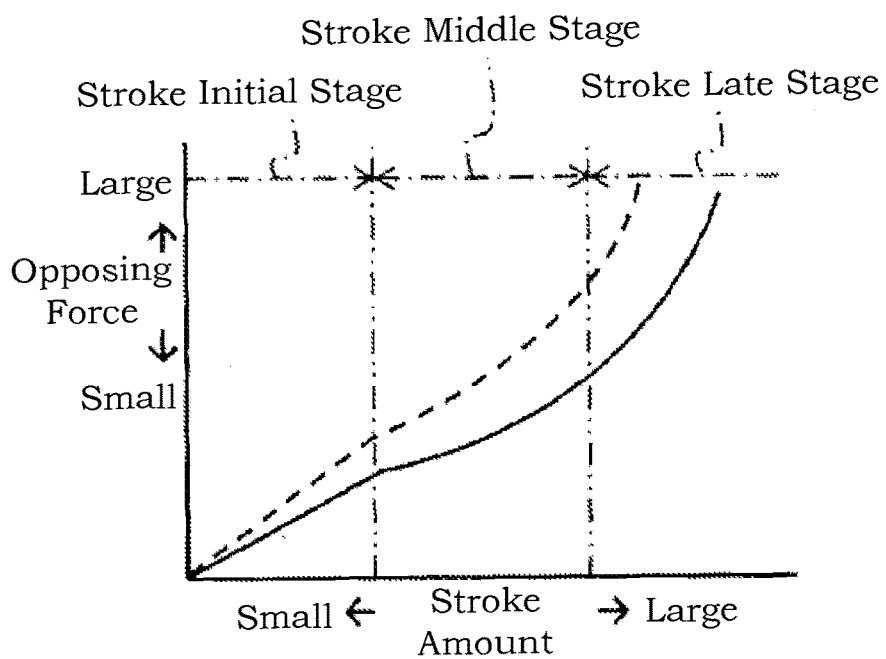
FIG. 5 is a graph illustrating the relationship between a stroke amount and an opposing force in a suspension device of a comparative embodiment.

The relationship between the stroke amount and the opposing force in a suspension device that does not include the volume expanding mechanism A is illustrated by the solid line in FIG. 5.

If the suspension device does not include the volume expanding mechanism A, at the initial stage of the stroke, or in other words in a state in which the compression amount of the shock absorber is small and the balance spring acts, the opposing force characteristics of the suspension device are realized as composite characteristics of both the balance spring and the air spring. Therefore, the opposing force characteristics at the initial stage of the stroke of the suspension device are substantially linear.

At the middle and late stages of the stroke of the suspension device, or in other words a state in which the compression amount of the shock absorber is large and the balance spring no longer acts, the opposing force characteristics are realized by only the air spring. Therefore, the opposing force characteristics in the middle stage of the stroke and the late stage of the stroke of the suspension device are non-linear.

Therein, if the air spring (suspension spring) is adjusted so that the opposing force during the middle stage of the stroke of the suspension device becomes large, the opposing force may become too large during the late stage of the stroke as illustrated by the dashed line in FIG. 5.

The suspension device according to the present embodiment includes the shock absorber D and the air spring S1 that constantly biases the shock absorber D in the extension direction, and the air spring S1 consists of a compressed gas that is sealed in the air chamber E1 that expands/contracts in volume as the shock absorber D extends/compresses. The suspension device according to the present embodiment also includes the volume expanding mechanism A that expands the volume of the air chamber E1 according to an increase in the compression amount of the shock absorber D when the compression amount of the shock absorber D has reached or exceeded a predetermined amount.

The volume expanding mechanism A expands the volume of the air chamber E1 according to an increase in the compression amount of the shock absorber D and contracts the volume of the air chamber E1 according to a decrease in the compression amount of the shock absorber D only when the compression amount of the shock absorber D has reached or exceeded the predetermined amount. The opposing force of the air spring S1 decreases as the volume of the air chamber E1 increases. Therefore, by providing the volume expanding mechanism A, the opposing force during the late stage of the stroke of the suspension device can be cut according to the stroke amount.

If the opposing force of the air spring is adjusted so that the opposing force during the middle stage of the stroke of the suspension device becomes large, the opposing force may become too large during the late stage of the stroke in the suspension device that does not include the volume expanding mechanism A as described above. In contrast, in the suspension device according to the present embodiment, the opposing force during the late stage of the stroke is suppressed as illustrated by the solid line a3 in FIG. 4 compared to the opposing force in the case in which the volume expanding mechanism A is not provided as shown by the dashed line a4. Therefore, the opposing force during the late stage of the stroke can be prevented from becoming too large even if the opposing force during the middle stage of the stroke is increased.

Further, the volume expanding mechanism A includes the sub-cylinder 30, the auxiliary chamber E2 formed within the sub-cylinder 30, and the movable partition wall 5 that slidingly contacts an inner peripheral surface of the sub-cylinder 30 to divide the air chamber E1 and the auxiliary chamber E2, and the movable partition wall 5 moves to the auxiliary chamber E2 side when the compression amount of the shock absorber D has reached or exceeded the predetermined amount. The amount of movement of the movable partition wall 5 increases according to an increase in the compression amount of the shock absorber D. In other words, the movable partition wall 5 moves further to the auxiliary chamber E2 side as the compression amount of the shock absorber D increases.

In this way, by providing the movable partition wall 5, the constitution for increasing the volume of the air chamber E1 according to an increase in the compression amount of the shock absorber D is easily implemented.

The volume expanding mechanism A also includes the air spring S2 that biases the movable partition wall 5 to the air chamber E1 side and the stopper 6 that prevents the movable partition wall 5 from moving to the air chamber E1 side when the compression amount of the shock absorber D is less than the predetermined amount.

In other words, by setting the biasing force of the air spring S2 so that the movable partition wall 5 moves to the auxiliary chamber E2 side against the biasing force of the air spring S2 when the compression amount of the shock absorber D has reached the predetermined amount, the volume of the air chamber E1 can be expanded according to an increase in the compression amount of the shock absorber D. Therefore, the constitution for expanding the volume of the air chamber E1 according to an increase in the compression amount of the shock absorber D can be simplified.

By providing the stopper 6, the constitution that the movable partition wall 5 moves only when the compression amount of the shock absorber D has reached or exceeded the predetermined amount is easily implemented.

The air spring S2 that serves as a biasing means consists of a compressed gas that is sealed within the auxiliary chamber E2.

Therefore, the weight of the suspension device can be reduced compared to a case in which the means for biasing the movable partition wall 5 to the air chamber E1 side is a coil spring or the like. Further, by intake/discharge of gas into/out of the auxiliary chamber E2, the biasing force (opposing force) of the air spring S2 can easily be adjusted, and the timing at which the movable partition wall 5 begins to move can also easily be adjusted.

The shock absorber D includes the shock absorber main body T having the outer tube 1 and the inner tube 2 that is retractably inserted into the outer tube 1. Also, the sub-cylinder 30 is accommodated within the shock absorber main body T and the air chamber E1 is formed within the shock absorber main body T.

In other words, since the volume expanding mechanism A and the air spring S1 can be accommodated within the shock absorber main body T, any increases in the size of the suspension device can be prevented even if the volume expanding mechanism A is provided.

Embodiments of this invention were described above, but the above embodiments are merely examples of applications of this invention, and the technical scope of this invention is not limited to the specific constitutions of the above embodiments.

For example, in the above-described embodiment, the suspension device is a front fork that suspends a front wheel in a saddle-type vehicle such as a motorcycle or a three-wheeled vehicle. However, the suspension device can be a reaction unit that suspends the rear wheel in a saddle-type vehicle, or a suspension device for another type of vehicle.

Further, in the above-described embodiment, the suspension device is set to be an inverted type in which the outer tube 1 is arranged on the vehicle body side and the inner tube 2 is arranged on the vehicle wheel side. However, the suspension device can also be set to be an upright type in which the inner tube 2 is arranged on the vehicle body side and the outer tube 1 is arranged on the vehicle wheel side, and the constitution of the suspension device can be appropriately modified.

Also, in the above-described embodiment, the shock absorber D is set to be an inverted type in which the cylinder 31 is arranged on the vehicle body side and the piston rod 21 is arranged on the vehicle wheel side. However, the shock absorber D can also be set to be an upright type in which the cylinder 31 is arranged on the vehicle wheel side and the piston rod 21 is arranged on the vehicle body side, and the constitution of the shock absorber D that constitutes the suspension device can be appropriately modified.

Further, in the above-described embodiment, the volume expanding mechanism A is accommodated within the shock absorber main body T. However, the present invention is not limited to this constitution, and a sub-tank as the sub-cylinder 30 can be attached externally to the shock absorber main body T. Also, in the above-described embodiment, the sub-cylinder 30 and the cylinder 31 are formed separately, but they can also be formed integrally.

In addition, in the above-described embodiment, the volume expanding mechanism A includes the movable partition wall 5, and the volume of the air chamber E1 can be expanded by moving the movable partition wall 5 to the auxiliary chamber E2 side. However, the volume of the air chamber E1 can also be expanded by some other method besides the movable partition wall 5.

Moreover, in the above-described embodiment, the movable partition wall 5 that constitutes the volume expanding mechanism A is biased by the air spring S2 to the air chamber E1 side and moves to the auxiliary chamber E2 side according to an increase in the compression amount of the shock absorber D, and this enables the volume of the air chamber E1 to be expanded. However, the volume expanding mechanism A can also be configured to include a sensor that senses the compression amount of the shock absorber D, a motor that drives the movable partition wall 5, a motion converting mechanism that converts a rotating motion of the motor to a linear motion of the movable partition wall 5, and a control device that drives the motor based on a value sensed by the sensor. Thereby, the volume expanding mechanism A can operate the motor according to the compression amount of the shock absorber D to move the movable partition wall 5.

Further, in the above-described embodiment, the air spring S2 is used as a means for biasing the movable partition wall 5, but the biasing means can also be a coil spring.

With respect to the above description, the contents of application No. 2012-223767, with a filing date of Oct. 9, 2012 in Japan, are incorporated herein by reference.

The invention claimed is:
1. A suspension device, comprising:
    a shock absorber,
    an air spring that consists of a compressed gas that is sealed within an air chamber that expands/contracts in volume as the shock absorber extends/compresses so as to constantly bias the shock absorber in an extension direction, and
    a volume expanding mechanism that expands a volume of the air chamber as a compression amount of the shock absorber increases when the compression amount of the shock absorber has reached or exceeded a predetermined amount, wherein the volume expanding mechanism comprises:
    a sub-cylinder,
    an auxiliary chamber that is formed within the sub-cylinder, and
    a movable partition wall that slidingly contacts an inner peripheral surface of the sub-cylinder to divide the air chamber and the auxiliary chamber,
    wherein the movable partition wall moves further to an auxiliary chamber side as the compression amount of the shock absorber increases when the compression amount of the shock absorber has reached or exceeded a predetermined amount.
2. The suspension device according to claim 1, wherein the volume expanding mechanism further comprises:

a biasing means that biases the movable partition wall to an air chamber side, and a stopper that prevents the movable partition wall from moving to the air chamber side when the compression amount of the shock absorber is less than the predetermined amount.

3. The suspension device according to claim 2, wherein the biasing means consists of a compressed gas sealed within the auxiliary chamber.

4. The suspension device according to claim 1, wherein the shock absorber includes a shock absorber main body having an outer tube and an inner tube that is retractably inserted into the outer tube, and the sub-cylinder is accommodated within the shock absorber main body and the air chamber is formed within the shock absorber main body.

5. A suspension device, comprising:

a shock absorber, an air spring that consists of a compressed gas that is sealed within an air chamber that expands/contracts in volume as the shock absorber extends/compresses so as to constantly bias the shock absorber in an extension direction, and a volume expanding mechanism that expands a volume of the air chamber as a compression amount of the shock absorber increases when the compression amount of the shock absorber has reached or exceeded a predetermined amount, wherein the volume expanding mechanism comprises:

a sub-cylinder, an auxiliary chamber that is formed within the sub-cylinder, and a movable partition wall that slidingly contacts an inner peripheral surface of the sub-cylinder, and separates the air chamber and the auxiliary chamber so as to maintain fluid separation between the air chamber and the auxiliary chamber as the compression amount of the shock absorber increases when the compression amount of the shock absorber has reached or exceeded the predetermined amount.

* * * * *